July 24, 1956  W. GERSTENBERGER  2,755,872
FLUID DAMPER FOR ROTARY WING AIRCRAFT
Filed March 6, 1952  2 Sheets-Sheet 1

INVENTOR.
WALTER GERSTENBERGER
BY
M. B. Tasker
ATTORNEY

July 24, 1956 W. GERSTENBERGER 2,755,872
FLUID DAMPER FOR ROTARY WING AIRCRAFT
Filed March 6, 1952 2 Sheets-Sheet 2
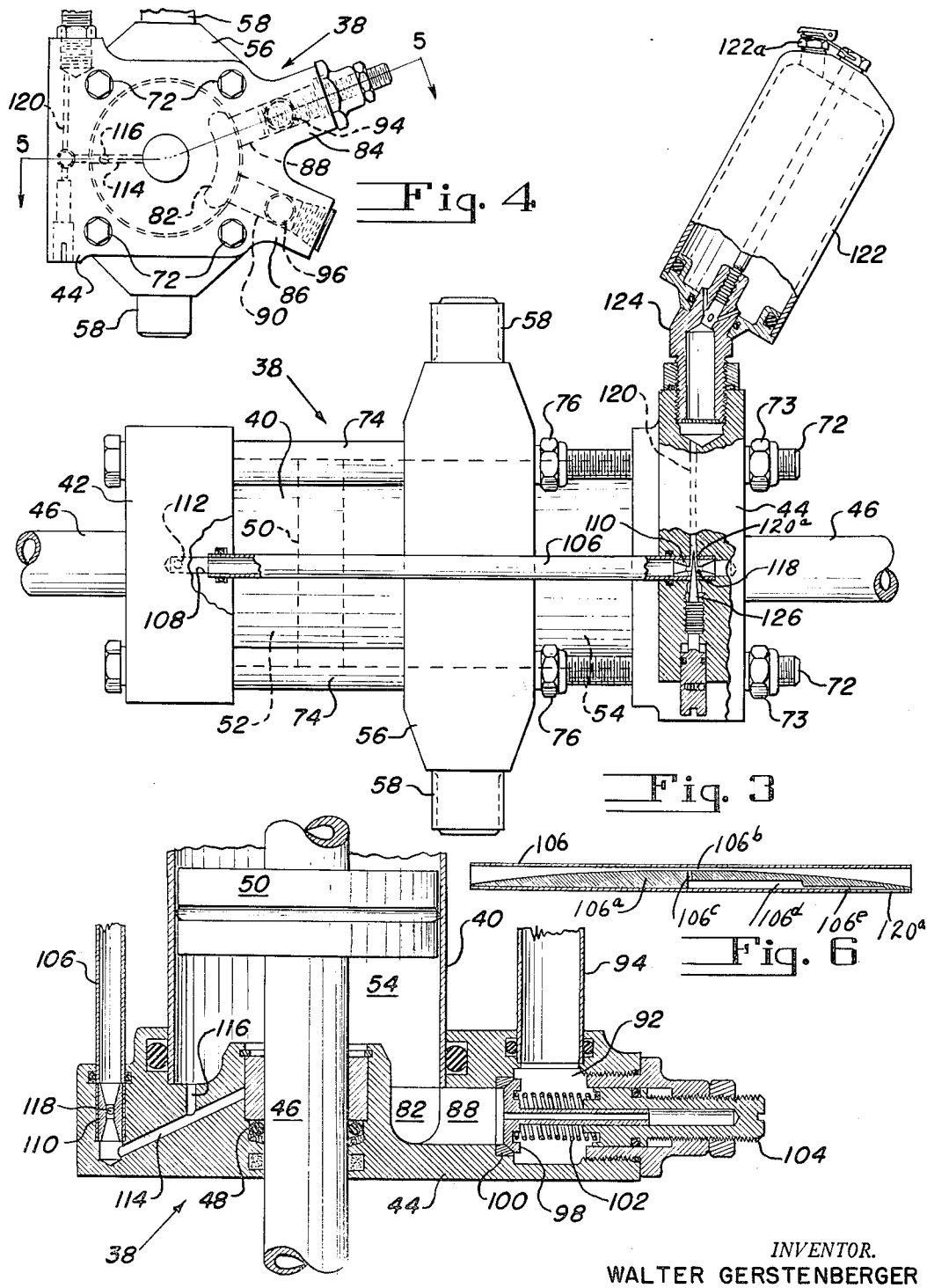
INVENTOR.
WALTER GERSTENBERGER
BY M. B. Tasker
ATTORNEY

United States Patent Office 2,755,872
Patented July 24, 1956

2,755,872
FLUID DAMPER FOR ROTARY WING AIRCRAFT

Walter Gerstenberger, Milford, Conn., assignor to United Aircraft Corporation, East Hartford, Conn., a corporation of Delaware Application March 6, 1952, Serial No. 275,163

7 Claims. (Cl. 170—160.55)

This invention relates to rotary wing aircraft of the type having separately articulated rotor blades, and particularly to improvements in fluid dampers used to control the movements of such blades in the plane of blade rotation. A damper of this type is shown in the Buivid Patent No. 2,554,774, issued May 29, 1951, and assigned to the assignee of this application.

As shown in this Buivid patent, the damper includes piston and cylinder elements one of which is connected to the blade and the other of which is connected to aircraft structure with respect to which the blade moves about its drag hinge. The damper chambers on opposite sides of the piston have heretofore been supplied with fluid from a fluid reservoir, vented to the atmosphere. Also the damper chambers have been connected to the reservoir by a passage including a restricted orifice and a check valve. As the damper piston reciprocates in a damper of this type, a partial vacuum forms on the low pressure side of the piston due to air in the damper, or present as occluded air in the fluid, and fluid displaced on the pressure side of the piston surges into the reservoir and tends to overflow through the reservoir vent. This pumping action not only causes foaming of the oil in the damper but also soon reduces the oil supply in the damper system to a point where the damper may become inoperative.

It is an object of this invention to eliminate cavitation on the low pressure side of the damper piston and to provide means for automatically bleeding any air in the damper chambers to the atmosphere through the reservoir during each stroke of the damper.

Another difficulty which has been encountered in this type of damper arises from the presence of two check valves heretofore required in the fluid conduit between the damper chambers since these check valves prevent the escape of fluid from the damper body to the reservoir when the damper is not operating. Fluid which has been sucked into the damper during a cold night is prevented from returning to the reservoir and if the aircraft is sitting in the sun the following day the confined oil will frequently expand and burst the damper.

It is therefore another object of this invention to eliminate check valves in the fluid lines of such dampers.

A further object of the invention is generally to improve the construction and operation of fluid dampers for rotor blades.

These and other objects and advantages of the invention will be evident from the accompanying drawings or will be pointed out in the following description of these drawings.

In these drawings:

Fig. 3 is a still further enlarged view partly in side elevation, partly in section, of one of the dampers shown in Fig. 2;

Fig. 4 is an end view of the damper from the right-hand end of Fig. 3 with parts broken away to facilitate illustration;

Fig. 5 is a section on an enlarged scale on line 5—5 of Fig. 4; and

Fig. 6 is a detail of a modified construction.

Figure 1:
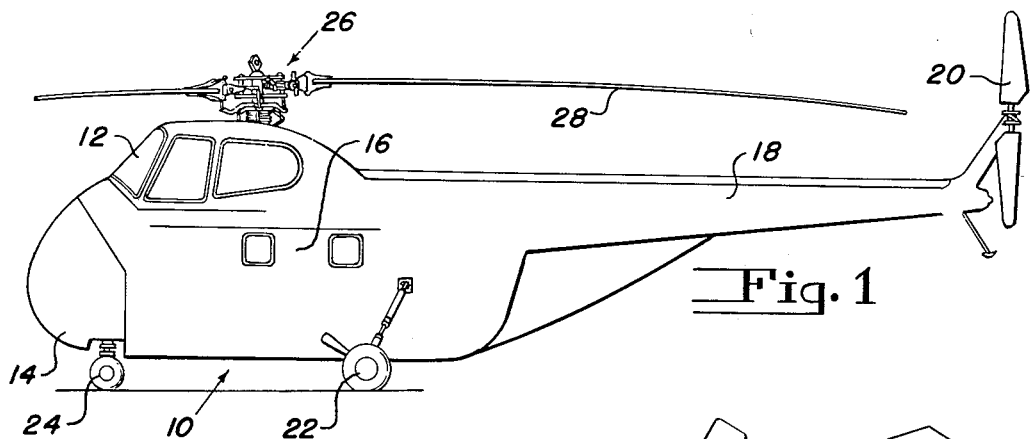
Fig. 1 is a side view of a helicopter the rotor blades of which are equipped with the improved dampers of this invention.

In Fig. 1 a helicopter is shown having a body 10 including a pilot compartment 12, an engine compartment 14 and a passenger or cargo compartment 16. The helicopter also includes a tail cone 18 supporting an antitorque rotor 20 and is supported on main landing gear 22 and nose gear 24. Directly above the passenger compartment 16 the helicopter has a rotor hub generally indicated at 26 on which are mounted a plurality, herein three, rotor blades 28.

The rotor head of the helicopter is shown more in detail and is claimed in the copending application of Michel D. Buivid, Serial No. 218,313, filed March 30, 1951, now Patent No. 2,638,994, dated March 19, 1953, and reference is made to this application for further details of the blade mounting structure. It will be sufficient for an understanding of the present invention to point out that each of the rotor blades 28 is separately articulated to the hub 26 for movement about a generally horizontal flapping hinge 30 and a drag hinge 32 at right angles thereto, the latter hinge permitting movements of the blade in a lead or lag direction in the plane of blade rotation. It is the movement of the blade about the drag hinge 32 which is controlled by the damper to which this invention relates. It will be evident from Fig. 2 that the drag hinge 32 is journalled in upper and lower plates 34 and 36 of the hub and that the flapping hinge 30 intersects the drag hinge 32.

Figure 2:
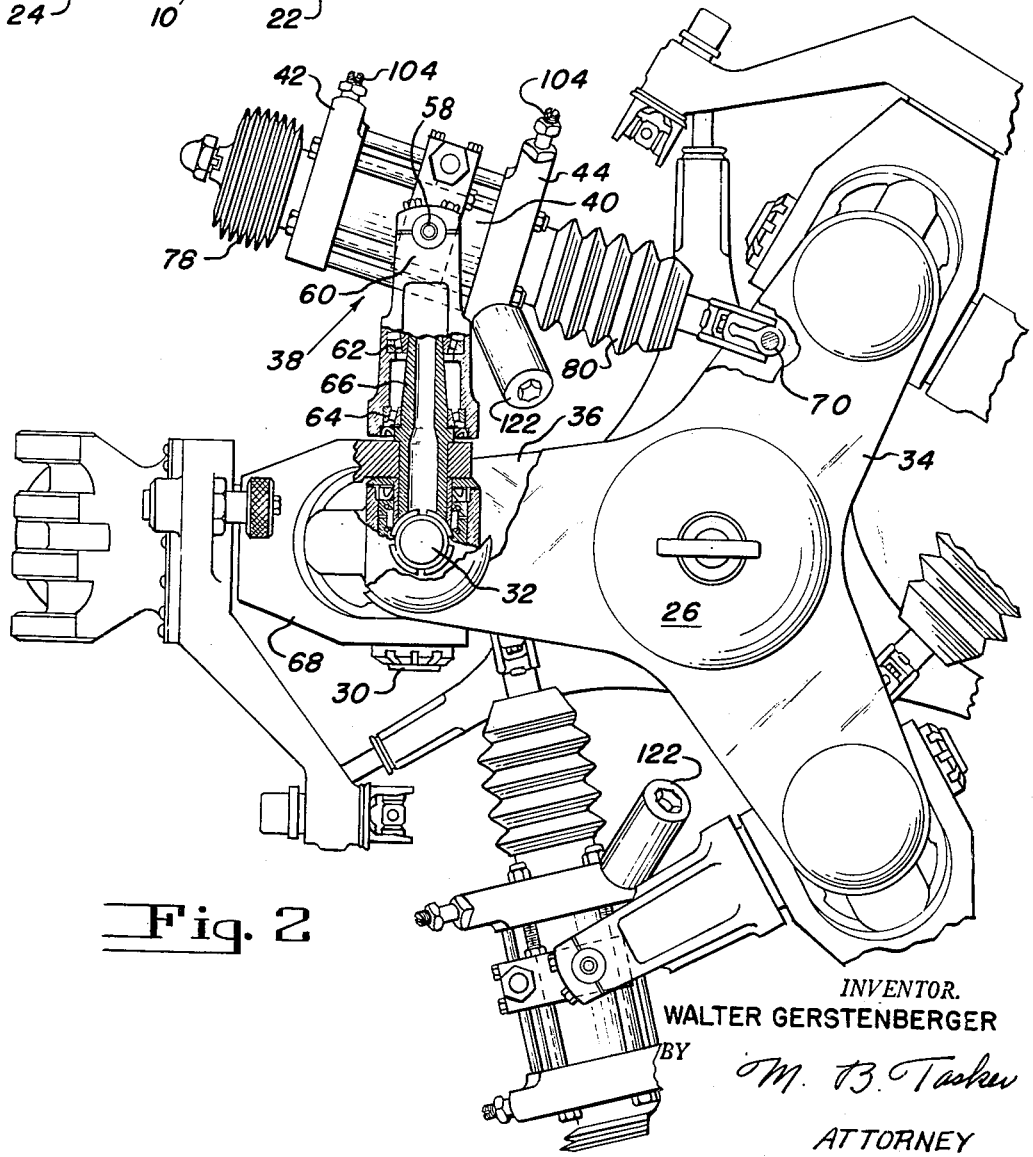
Fig. 2 is an enlarged plan view of the rotor head showing the improved dampers, parts being broken away to facilitate illustration.

The damper which is generally indicated at 38 consists essentially of a cylinder 40 open at both ends having end closure member 42 and 44 on its opposite ends. A piston rod 46 extends through the cylinder and through suitable packing means 48 in members 42 and 44, as is shown at one end of the cylinder in Fig. 5. The piston rod 46 carries a piston 50 within the cylinder which divides the interior of the cylinder into two damper chambers 52 and 54 on opposite ends of the piston. The damper also includes a member 56 surrounding the cylinder 40 and located between the end members 42 and 44 which carries trunnions 58 by which the damper cylinder is supported on a yoke 60. As shown in Fig. 2, the yoke is journalled for rotation on bearings 62 and 64 carried by an extension 66 of the flapping hinge 30. Thus the cylinder element of the damper moves bodily with the flapping link 68 of the blade. The piston element of the damper is pivotally connected to the hub structure by pivotally connecting the rod 46 to the hub at 70 so that as the blade lags and leads about its drag hinge 32, the piston 50 moves in the cylinder 40 as is usual in dampers of this type. The cylinder 40 and members 42, 44 and the intermediate member 56 of the damper are held in assembled relation by means of four clamping bolts 72 and clamping nuts 73, the end member 42 and intermediate member 46 being spaced apart by four tubular spacers 74 on bolts 72 and clamped by nuts 76. As shown in Fig. 2, bellows type dirt seals 78 and 80 are provided to enclose the protruding ends of the piston rod 46 at the ends of the damper housing in the usual manner.

As shown in Figs. 4 and 5, end members 42 and 44 have confronting arcuate manifold passages 82 therein which communicate with respective damper chambers 52 and 54 within cylinder 40. Each end member also has two radial bosses 84 and 86 formed integral therewith having radial passages 88 and 90 respectively which communicate with manifold 82 at one end and with passages 92 in the inner face of the end member. One of these passages 92 is shown in Fig. 5. The two passages 92 of opposite end members are confronting and are connected by two tubular ducts 94 and 96 through which fluid may pass between damper chambers 52 and 54 as controlled by two identical spring biased relief valves 98, one of which is shown in Fig. 5. These valves are so arranged that when the fluid in damper chamber 54, for example, is under pressure, as piston 50 moves to the right in Fig. 3, the valve 98 in the end chamber 44 will open at a predetermined setting and allow fluid to pass through the tubular duct 94 to the damper chamber 52 on the other end of the piston. Similarly when the piston moves to the left in Fig. 3 and fluid in damper chamber 52 is under pressure, the relief valve 98 in fitting 42 will open and permit the fluid to flow through tubular conduit 96 to chamber 54.

Each relief valve 98 is held on an annular seat 100 by a spring 102, the tension of which is adjusted by turning a plug 104 threaded into the valve body. These pressure relief valves are set to open at a pressure which will enable the damper to control ground resonance when the ship is on or near the ground but which will relieve the blades from severe stresses encountered in normal flight when the blade movements about the drag hinge are greater than when the ship is in hovering flight, as in take-off or landing.

The damper chambers 52 and 54 are also connected by a smaller diameter conduit 106. As is shown most clearly in Fig. 3, this conduit is received in aligned passages 108 and 110 in end members 42 and 44. Passage 108 is connected by passage 112 to damper chamber 52 while passage 110 is connected by passages 114 and 116 (Fig. 5) in end member 44 with damper chamber 54. It will be noted that passage 110 in end member 44 forms a deep chamber which receives the end of conduit 106 and that a venturi passage 118 is located in the end of the duct 106. Thus when the piston 50 is moved, fluid will flow under pressure from one damper chamber to the other through conduit 106 and the venturi passage 118. End member 44 also has a bleed passage 120 (Fig. 3) which communicates through a passage 120a in conduit 106 with the venturi passage at its throat and extends upwardly above the cylinder 40 to a fluid reservoir 122 which, due to an angle fitting 124, is inclined slightly upwardly and inwardly toward the axis of rotation of the hub.

While it is not necessary, it may be desirable to provide a needle valve 126 in the end member 44, the tapered end of which intersects the venturi orifice but due to its configuration never closes this orifice. This needle valve which is adjustable from ouside the damper, enables the size of the orifice to be varied somewhat to obtain the desired operation of the damper. However, when the characteristics of a particular ship have been determined, it should not be necessary to change the orifice size and needle valve 126 may well be omitted.

In Fig. 6 a modified construction of the venturi passage is shown. The conduit 106 is the same as in the previous construction but a longer venturi passage is provided which extends from end to end of conduit 106. This passage is formed by an elongated member 106a which conforms to the curvature of the conduit on one side but has its diametrically opposite side tapered from the middle toward both ends so as to form, with the inside wall of the conduit, a long venturi passage having a throat 106b. Fluid communication between the venturi throat 106b and bleed passage 120 is provided by a transverse passage 106c in member 106a and communicating passages 106d and 106e formed by removing portions of member 106a adjacent the wall of conduit 106. Passage 106e communicates with bleed passage 120 through passage 120a in conduit 106, as before.

In the operation of the improved damper, as the blade moves in a leading or lagging direction about its drag hinge, the cylinder element of the damper will be moved relative to the piston element to displace fluid from one damper chamber. The displaced fluid will flow through duct 106 and through the venturi orifice to the other damper chamber, or low pressure side of the piston. Thus, for example, if the cylinder is moving toward the right in Fig. 3, fluid in damper chamber 52 will flow under pressure through passages 112 and 108, through conduit 106, venturi passage 118, and passages 114 and 116 to damper chamber 54. Since the throat of the venturi orifice is in communication through bleed 120 with the reservoir 122, which is at atmospheric pressure by reason of the vent 122a, the pressure on the fluid in the low pressure damper chamber 54 and the communicating passages will always be greater than atmospheric and hence cavitation back of the piston will not take place. Any air which may have leaked into the damper or which may be present as occluded air in the oil in the damper will be vented to atmosphere. Since any air in the system is bled into the reservoir, there will be no tendency for the displaced fluid from damper chamber 52 to surge into the reservoir 122 as was formerly the case.

It will also be noted that fluid is always free to move through the duct 106 between damper chambers 52 and 54 or vice versa, since this duct and its communicating passages are completely free from check valves formerly found necessary in dampers of this type. It will thus be evident that as a result of the present invention, foaming of the oil in the damper due to cavitation on the low pressure side of the piston has been eliminated as well as spilling of the oil from the damper reservoir due to surging of the fluid into the reservoir from the high pressure side of the piston.

It will also be clear that expansion of the fluid in the damper due to changes in temperature cannot result in destruction of the damper due to the presence of check valves formerly found necessary between the damper chambers and the reservoir. Another damper application assigned to applicant's assignee is application Serial No. 285,903, filed May 3, 1952.

While only one embodiment of the invention has been shown and described herein for the purpose of illustrating the invention, it will be obvious that various changes in the construction and arrangement of the parts are possible without departing from the scope of the invention.

I claim:

1. In combination, a rotor having an axis of rotation, a damping device mounted thereon, said device including a cylinder, a double acting piston mounted in said cylinder and forming a damper chamber on each side of said piston, reservoir means containing a fluid vented to the atmosphere, a fluid passageway connecting said chambers and having therein a restricted throat portion, said reservoir means being located nearer to the axis of rotation of the rotor than the restricted throat portion is, and a second passageway connecting said reservoir with said first passageway at said restricted throat portion for maintaining said throat portion at a pressure of not less than substantially atmospheric pressure.

2. A damping device, said device including a cylinder, a double acting piston mounted in said cylinder and forming a damper chamber on each side of said piston, a hydraulic fluid reservoir vented to the atmosphere, a fluid passageway connecting said chambers and having therein a restricted throat portion, and means for connecting the pressure in the damper chamber on the low pressure side of said piston to a pressure the value of which is at least substantially atmospheric including a bleed passageway connecting the hydraulic fluid in said reservoir with said first mentioned passageway at the restriction of said throat portion, means mounting said reservoir so that the fluid in said reservoir is in communication with said restriction during operation of said damping device.

3. A damping device, said device including a cylinder, a double acting piston mounted in said cylinder, a hydraulic reservoir for fluid vented to the atmosphere, a passageway connecting the chambers on opposite sides of said piston having a venturi therein, and a second passageway connecting said reservoir with said first passageway at the throat of said venturi for supplying a fluid to said passageway, means for mounting said reservoir so that in operation a fluid in said reservoir is in communication with said venturi.

4. A fluid damper for rotary wing aircraft in which a rotor blade having an axis of rotation is mounted for movement about a drag hinge, said damper comprising cylinder and piston elements, one of which is connected to and is movable with the blade as the latter moves about its drag hinge and the other of which is fixed to aircraft structure with respect to which said blade moves in moving about its drag hinge, said piston and cylinder elements forming two variable volume chambers adapted to contain fluid, a passageway connecting said chambers including a venturi, reservoir means containing fluid to be connected to said venturi having a vent to atmosphere, said reservoir means being located nearer to the axis of rotation of the blade than the restricted throat portion is, and a second passageway connecting said reservoir means with said first mentioned passageway at the throat of said venturi.

5. A fluid damper for rotary wing aircraft in which a rotor blade having an axis of rotation is mounted for movement about a drag hinge, said damper being connected between said blade and aircraft structure with respect to which said blade moves in moving about its drag hinge and including cylinder and piston elements, two variable volume chambers on opposite sides of said piston element, a fluid passageway connecting said chambers having a venturi therein, control means for varying the degree of damping including means adjustable to vary the cross sectional area of said passageway, reservoir means containing fluid vented to the atmosphere for a supply to said chambers, said reservoir means being located nearer to the axis of rotation of the blade than the restricted throat portion is so that centrifugal force acts on the fluid in said reservoir to direct it towards said restricted throat portion, and a bleed passageway connecting the throat of said venturi to said reservoir.

6. A fluid damper for rotary wing aircraft in which a rotor blade having an axis of rotation is mounted for movement about a drag hinge, said damper including relatively movable cylinder and piston elements connected between said blade and a part of the aircraft relative to which said blade moves in moving about said drag hinge, fluid passageways connecting the damper chambers on opposite sides of said piston, relief valves in said passageways for relieving the pressure in said chambers in flight when said movements of said blade about said drag hinge are large, and a third passageway connecting said chambers for damping fluid flow between chambers when fluid pressures are below the pressures for which said relief valves are set to open, said third passageway having a restriction therein in the form of a venturi, fluid reservoir means containing a fluid vented to the atmosphere for a supply to said damper, said reservoir means being inclined nearer to the axis of rotation of the blade than the throat portion of said venturi, and a fluid connection between said reservoir and the throat of said venturi for preventing cavitation on the low pressure side of said piston.

7. A damping device, said device including a cylinder, a piston mounted in said cylinder forming damper chambers at opposite ends of said cylinder, a conduit connecting opposite ends of said cylinder having a venturi passage therein extending substantially from end to end of said conduit and having a throat intermediate its ends, a hydraulic reservoir containing fluid vented to the atmosphere, and passageway means connecting said reservoir with said venturi throat for supplying fluid to said venturi, means mounting said reservoir so that the fluid in said reservoir is in communication with said venturi during the operation of said damping device.

References Cited in the file of this patent

UNITED STATES PATENTS

| | | |
|---|---|---|
| 1,950,685 | McGee | Mar. 13, 1934 |
| 2,554,774 | Buivid | May 29, 1951 |
| 2,604,953 | Campbell | July 29, 1952 |